United States Patent
Gela et al.

[11] 3,844,658
[45] Oct. 29, 1974

[54] RANGE FINDER

[75] Inventors: Helmut Gela, Maria Enzersdorf; Walter Besenmatter, Vienna; Robert Scheiber, Vienna; Fritz Schneider, Vienna; Gerhard Röthy, Vienna, all of Austria

[73] Assignees: Karl Vockenhuber; Raimund Hauser, both of Vienna, Germany

[22] Filed: June 16, 1972

[21] Appl. No.: 263,426

[30] Foreign Application Priority Data
June 23, 1971 Austria .............................. 5472/71
Oct. 7, 1971 Austria .............................. 8687/71
Jan. 14, 1972 Austria .............................. 303/72

[52] U.S. Cl. .................... 356/4, 95/44 C, 250/201, 250/220 M
[51] Int. Cl. ............................................ G01c 3/08
[58] Field of Search .................... 356/4, 5; 95/44 C; 250/201, 220 SP, 204, 220 M

[56] References Cited
UNITED STATES PATENTS

| | | | |
|---|---|---|---|
| 3,270,647 | 9/1966 | Jakob et al. ............................ | 95/44 |
| 3,614,921 | 10/1971 | Yamanaka et al. .................. | 95/44 C |
| 3,623,811 | 11/1971 | Lederer et al. ........................ | 356/4 |
| 3,684,374 | 8/1972 | Humphrey .............................. | 356/4 |

Primary Examiner—Malcolm F. Hubler
Assistant Examiner—S. C. Buczinski
Attorney, Agent, or Firm—Ernest G. Montague; Karl F. Ross; Herbert Dubno

[57] ABSTRACT

A range finder system, and a range finding method, which comprise in combination at least one adjustable objective for forming a first image of an object in a first image plane. A device for adjusting the objective to focus the image in the image plane. An optical device forms a second image of the object in a second image plane, with focused objective, the first and second images being identical, whereas with defocused objective the images are different. A photoelectric receiver is movable along predetermined paths within the first and second image planes, with focused objective the paths include identical image points, whereby the photoelectric receiver supplies an electric output depending on the brightness of the individual image points of the images. An operating device is provided to move the photoelectric receiver along the predetermined paths. A device is also provided for comparing the output signals derived from the first image with the output signals derived from the second image. An evaluation device is connected to the comparison device to be controlled by the latter.

30 Claims, 13 Drawing Figures

RANGE FINDER

The invention relates to a range finder, preferably for the focusing of cameras, provided with an objective, in particular a camera objective for the reproduction of an object in partial images, and with at least one, preferably a number of photocells.

A range finder of the kind has become known from the German DOS 1 940 122. In this known embodiment there were provided two lines of photodiodes, whereby each of the lines passed in the corresponding partial image along the dividing line between the two partial images. This partial images were cut-images, whereby for instance the lower partial image reproduced the lower part of the scene, whereas the upper partial image reproduced the upper part of the scene. Such a construction however has the disadvantage that only satisfying results are obtained, if the object shows chiefly vertical lines. Should such a known range finder be used for objects, of which the picture content of the upper part differs widely from the lower part, the results are as bad as with objects with sloping or even horizontal lines.

By the invention these disadvantages are avoided by the following combination of features:

a. the partial images furnished by the optical system are substantially identical with each other and are preferably inverted images;

b. the photocell, preferably a photodiode, runs for light spot measuring through identical spots of the partial image planes, respectively in the case of a number of such photocells per partial image, these are arranged on identical spots of the partial image planes, preferably in line shape. Of course it is known per se to use for range finding partial images essentially of identical content. Hereto belong the range finder of Brander, the inverted-image range finder and the symmetrical range finder. While for the purpose of mere optical range finding the cut-image range finder is to be preferred because the eye is able to state from experience, if the two correlating lines coincide correctly or not, an electronic automatic means naturally is missing such an experience, where by it unexpectedly proved that just by the use of range finders with essentially identical partial images, the disadvantage of the known construction may be eliminated. The use of inverted images is advantageous for the reason that, if arranged in line shape, the photocells may be disposed in two lines side-by-side on a single support, preferably in integrated circuit technique.

An especially favourable development of the invention consists in the provision of at least two optical systems of different focal length to produce each of the partial images, whereby the difference in focal length shows measurable scale differencees in the image plane. In that way not only differences of brightness, but also difrerences of scale may additionally be measured.

Further details of the invention will become apparent from the following specification of the embodiments schematically illustrated in the accompanying drawings.

Figure 1A:
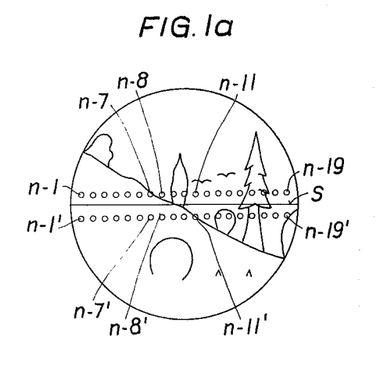
FIGS. 1a, 1b show a known range finder in two different settings of a scene.

With a known range finder according to the cut-image principle, a scene in the mountains may at correct setting look like illustrated in FIG. 1a. At both sides of the line of intersection S there are provided photocells $n-1$ to $n-19$ and $n-1'$ to $n-19'$, respectively, arranged in line shape. In the known range finder two and two photocells with the same end numeral, for instance $n-1$ and $n-1'$, $n-2$ and $n-2'$ were switched together in a reference circuit each, whereby same signals of the two photocells switched together indicated a correct setting. Upon checking FIG. 1a, it will appear that the signals of the photocells $n-7$ and $n-8$ do not correspond with those of the assigned photocells $n-7'$ and $n-8'$. Probably this applies also to the following two pairs of photocells, but for certain again to the photocells $n-11$ and $n-11'$, respectively, and also to most of the following pairs of photocells, as it is clearly demonstrated in FIG. 1a. For this reason a range finder of the known kind would indicate a wrong setting of the scene, though the distance setting was correct.

Figure 1B:
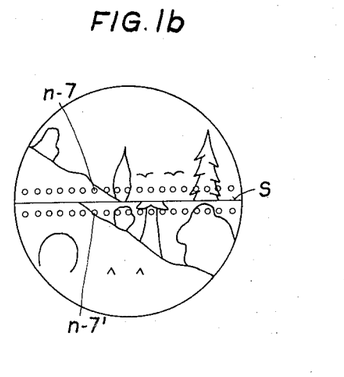

Not only that for certain scenes the known range finder indicates the signal "wrong setting" even at absolutely correct setting for the eye, also the contrary may occur and the signal "correct setting" may appear for such scenes, of which the setting appears to the human eye to be wrong. This is demonstrated in FIG. 1b referring to the same scene. It proves namely that with corresponding displacement of the two cut-images, the image on the photocell $n-7$ incidentally corresponds with the image on the photocell $n-11'$ in FIG. 1a. Upon displacement by four photocells according to FIG. 1b, there than results the same intensity of illumination for the photocells $n-7$ and $n-7'$, respectively. But in FIG. 1b also the rest of the pairs of photocells are equally illuminated, so that the known range finder would at a setting according to FIG. 1b signalize "correct setting."

Figure 2:
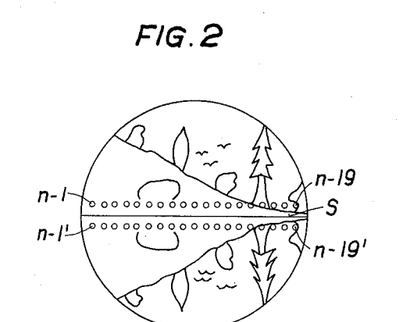
FIG. 2 represents the same scene in a range finder according to the invention.

In order to redress this grievance, the two partial images according to the invention are essentially identical, as it is shown in FIG. 2. As illustrated, preferably inverted images are used, because the photocells may be disposed side-by-side on a common support. It is of course also possible to use symmetrical images or the like. In that case the two lines of photocells are arranged differently. It would also be possible to manage with a single photocell, which passes the different image spots one after the other, but in that case a storage means for the signals furnished by the photocell would become necessary.

Figure 3:
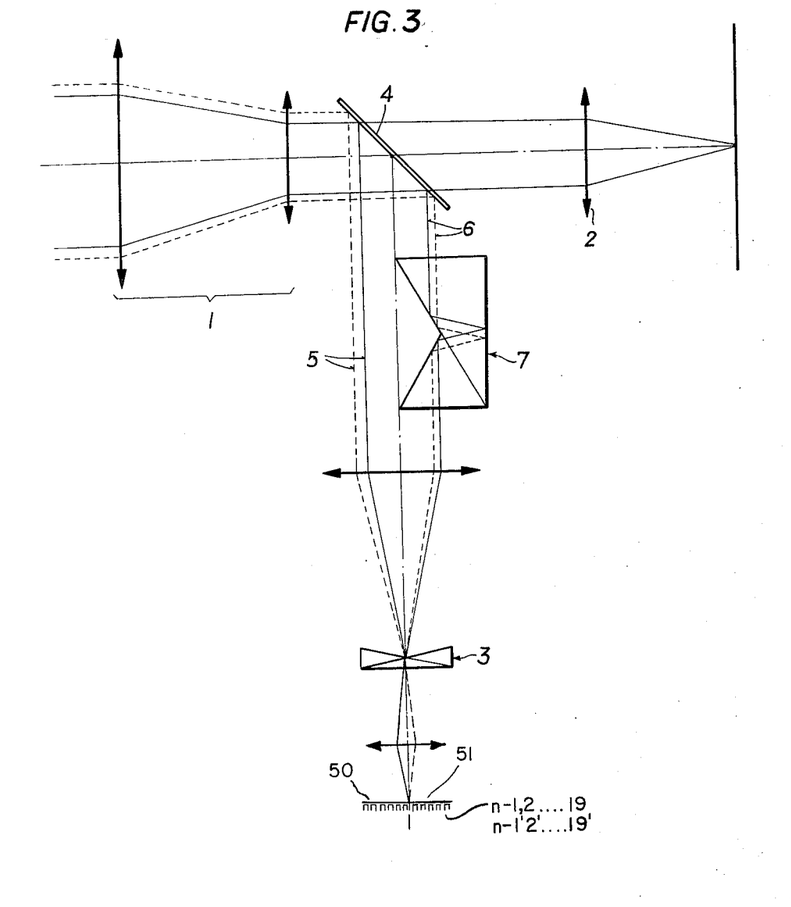
FIGS. 3 and 4 schematically illustrate the optical construction of the invention in two variations.

The optical arrangement for obtaining inverted images is known per se and offers no difficulties. Normally there are used two objectives arranged on the base, whereby the rays of one of the partial images pass through an inverting arrangement. In FIG. 3 there is illustrated a preferred embodiment, in which instead of two objectives a single one with an attachment 1 and a basic lens 2 and cutters 3 is provided. A semi-transparent mirror 4 is arranged between the attachment 1 and the basic lens 2, which reflects the beam of the two partial images 5 and 6, respectively. In the path of rays of the beam 6 for one of the partial images there is provided an inverting prism 7, which may consist of an Abbe-King prism or a Dove prism. As it may be seen, the space for disposing this prism 7 may be very small, wherefore the embodiment according to FIG. 4 may be preferable. Here a prism 8 is arranged behind the semi-transparent mirror 4. This prism shows in the diagonal up to the middle a reflector surface 9 for the beam 5. The beam 6 on the other hand passes unbroken and reaches a deviating mirror 10, which deviates it through a further prism 11 and an auxiliary lens 12 to the cutters 3.

Figure 4:
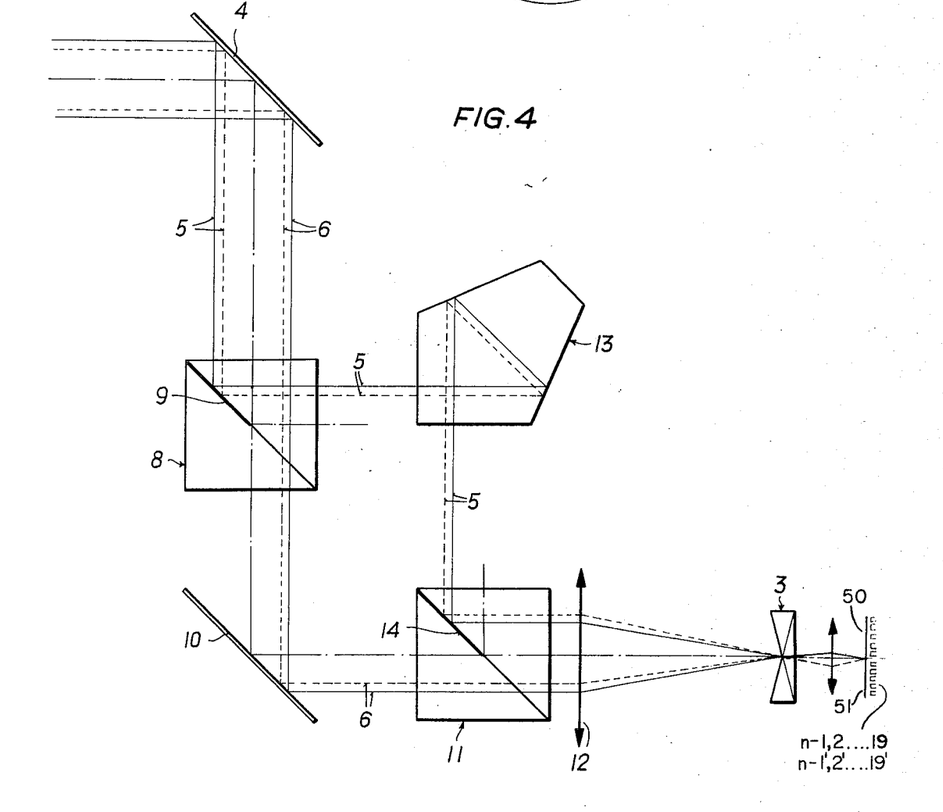

The beam 5 deviated from the reflector surface 9 is led through an inverting prism, in the present embodiment a Pentagon prism 13, and is guided by it towards the prism 11. The prism 11 shows like the prism 8 a reflector surface 14 up to its middle, through which the beam 5 is finally led to the cutters 3 over an auxiliary lens 12. The optical passages of the partial beams 5, 6 may be balanced by deviations, glas ways a.s.o.

Behind the cutters in image planes 50, 51 there is provided the electronic means, which may consist, as already mentioned, of one or also of a number of photocells, in particular photodiodes. In order to simplify the construction of circuit, which is rather complicated in the known range finder, there is provided a circuit according to FIG. 5.

Figure 5:
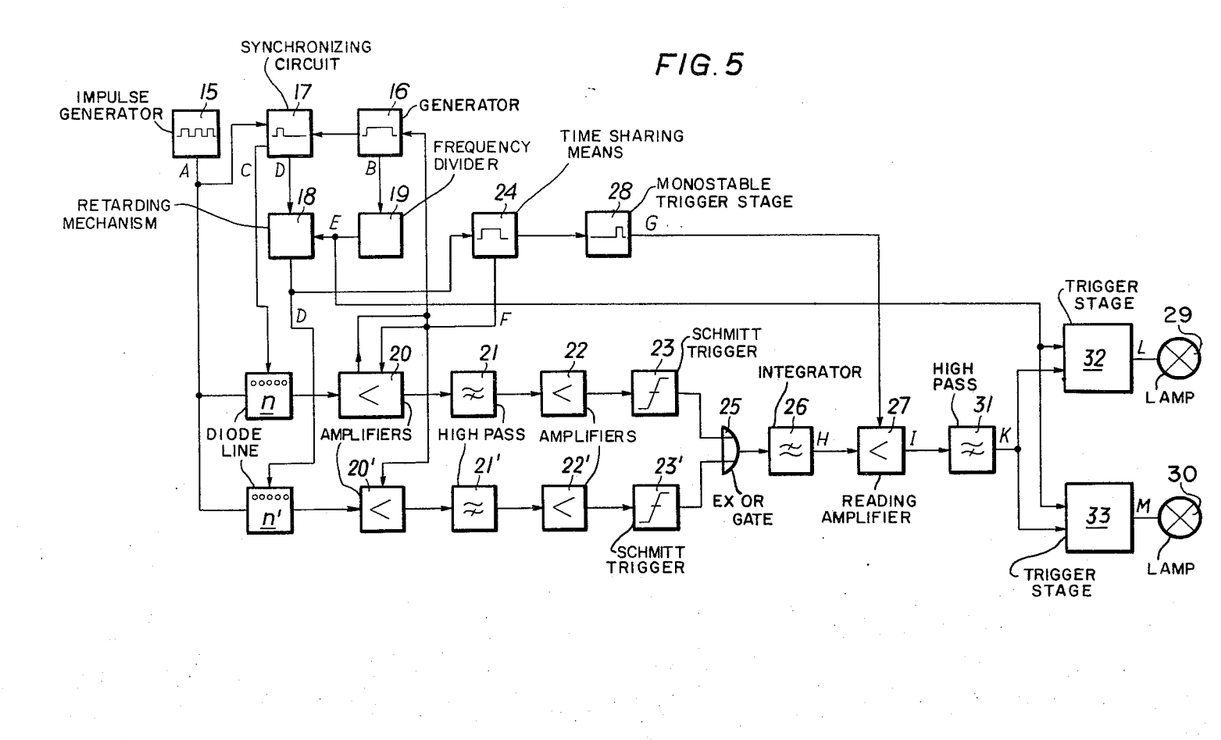
FIGS. 5, 6, 7a and 7b display a special form of interrogation of the photocells.
Figure 6:
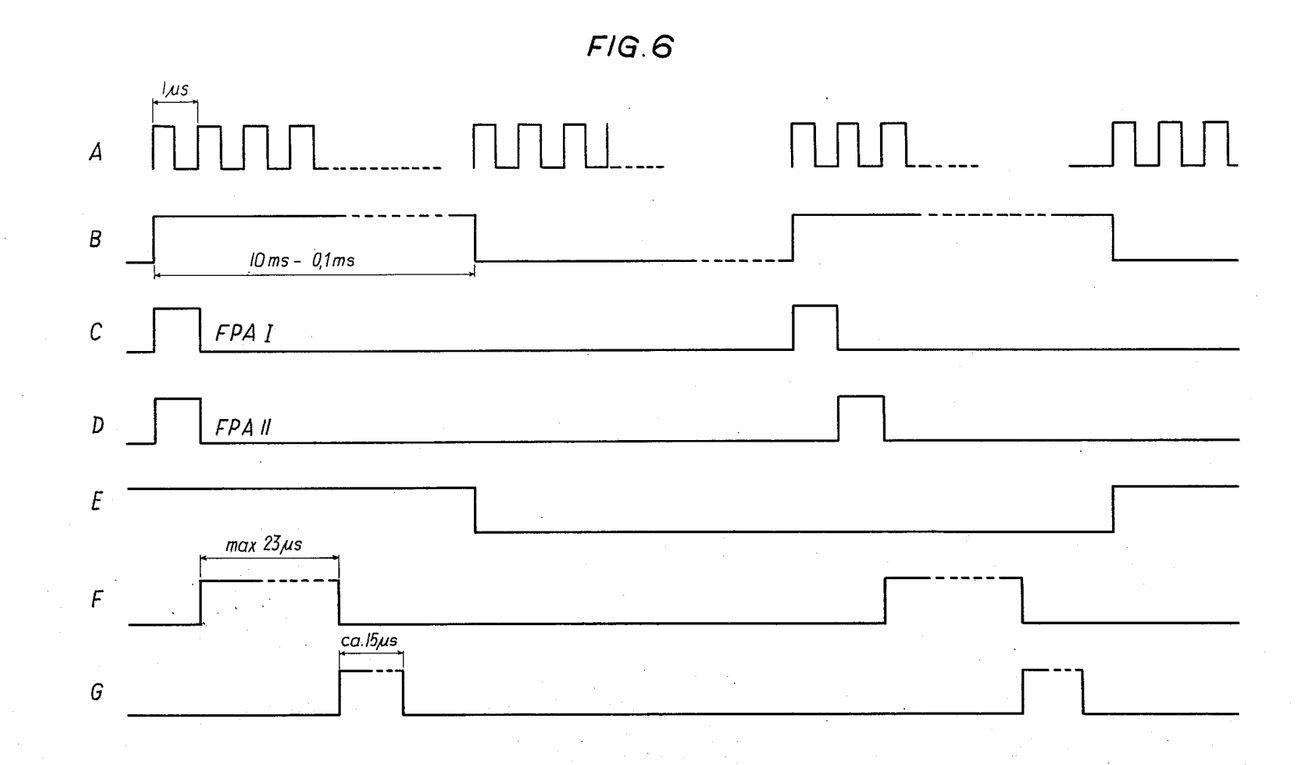

In this circuit according to FIG. 5 an impulse generator 15 produces a cadence signal A (FIG. 6). Then there is provided a further generator 16, which produces a signal B of much lower frequency. The synchronization of the phase position between the cadence signal A and a starting pulse C or D, respectively, furnished to the photocell lines n or n', respectively, is carried out by a synchronizing circuit 17, which also determines the pulse length of the starting pulses C, D.

While however the line n receives its starting pulse C directly, the starting pulse D first passes a retarding mechanism 18, which is controlled by a frequency divider 19. The frequency divider 19 divides the starting pulse B for the starting generator 16 in the ratio 1: 2. Therewith the retarding mechanism 18 is actuated only each second time and delays the starting pulse D, whereas the meanwhile occuring starting pulses D are allowed to pass undelayed (FIG. 6). In that way the two diode lines n and n', respectively, are in one case read together and simultaneously, whereas in the other case they are read with a certain deviation relatively to each other, which simulates a deviation of the two partial images relatively to each other.

The video signals received from the interrogation of the photocell lines n, N' are subsequently amplified in amplifiers 20, 20', then they pass a high-pass 21, 21', which suppresses eventually existing constant light, whereupon the signal so obtained is brought in a further amplifier 22 or 22', respectively, to a corresponding level value for a following threshold value switch, preferably a Schmitt-Trigger 23. This Schmitt-Trigger 23 or 23', respectively, digitalizes the video signal and so renders possible a digital treatment.

It is essential that the signal courses behind the diode line n, as also behind the line n' equal each other, that means that they show equal amplification, equal frequency curve and equal threshold values.

It may be mentioned here that the amplifier 20 furnishes a control voltage for the control of the repetition frequency of the starting pulses and in that way also controls the sensitivity of the diode line. A low repetition frequency results namely in a higher integration period of the photodiodes and consequently in a higher sensitivity. For the rest there is provided a sort of time sharing means 24, which releases by scanning the amplifiers 20, 20' only during the occuring video signal (see time sharing means F in FIG. 6), so that measuring errors and disturbances are substantially eliminated.

Figure 7A:
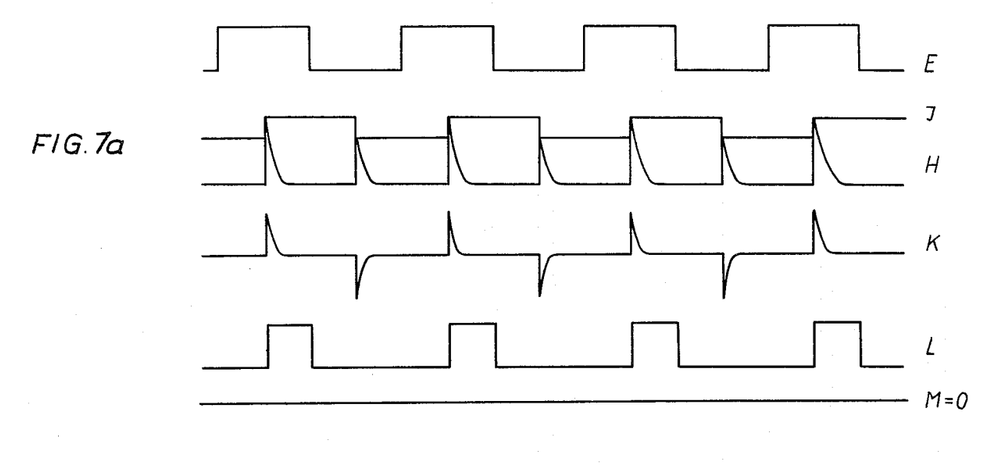

The outputs of the thresholdvalue switches 23, 23' are led to an EXOR gate 25, which forms the difference of the two video signals obtained. An output signal at this gate 25 occurs only then, when the furnished signals are unequal. That means that at inphase reproduction of the sighted object on the photocell lines n, n' and at simultaneous electrical interrogation (at undelayed starting pulse D) there results theoretically a zero signal at the output of the EXOR gate 25, or at least a signal of minimum intensity. An integrator 26 is provided for better plotting the signal coming from the gate 25. At the output of said integrator there appear integrated curves H (see FIG. 7a) of which at correct setting the amplitude is equally large. If however the two partial images are displaced relatively to each other, there results a periodical change in the amplitude of the integrated curves as a consequence of the displacement within the delay curcuit 18 due to the control signal E. FIG. 7a shows the form of the curve at too near setting, whereas FIG. 7b shows the form of the curve at too far setting.

Figure 7B:
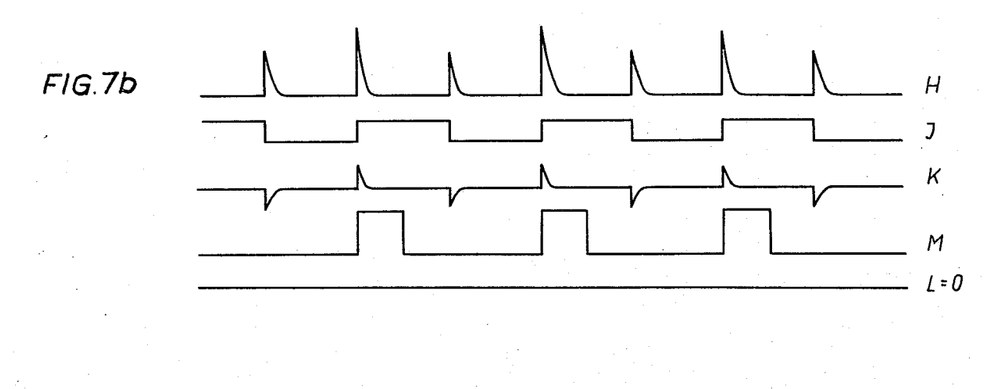

In a reading amplifier 27 a modulation frequency I is gained from the integrated curves H (see FIGS. 7a, 7b). The reading amplifier 27 is controlled in similar manner as the amplifier 20, 20' by a monostable trigger stage 28, which generates a signal G corresponding to the time sharing means F (see FIG. 6). The modulation frequency I issued by the reading amplifier 27 is balanced at sharp focusing to zero. If however the modulation frequency I is unequal to zero, the phase position to the interrogation frequency E indicated the deviation.

An information may for instance be obtained by means of lamps 29, 30, if the modulation frequency I is led through a highpass 31 to two bistable trigger stages 32, 33. These trigger stages 32, 33 are replaced from the frequency divider 19 by the corresponding flank of the control frequency E and are set by the corresponding flanks of the signal K gained from the highpass 31. At correct distance setting the lamps 29, 30 then give no signal, whereas in case of deviation in one direction the lamp 29 lights up in the rhythm of the signal L (FIG. 7a) and in case of deviations in the other direction, the lamp 30 flashes in the rhythm of the signal M (see FIG. 7b). Of course it is also feasible and useful to lead the signals L, M to a focusing motor for automatic focusing of, for instance, a camera objective, instead of the pilot lamps 29, 30.

Figure 8:
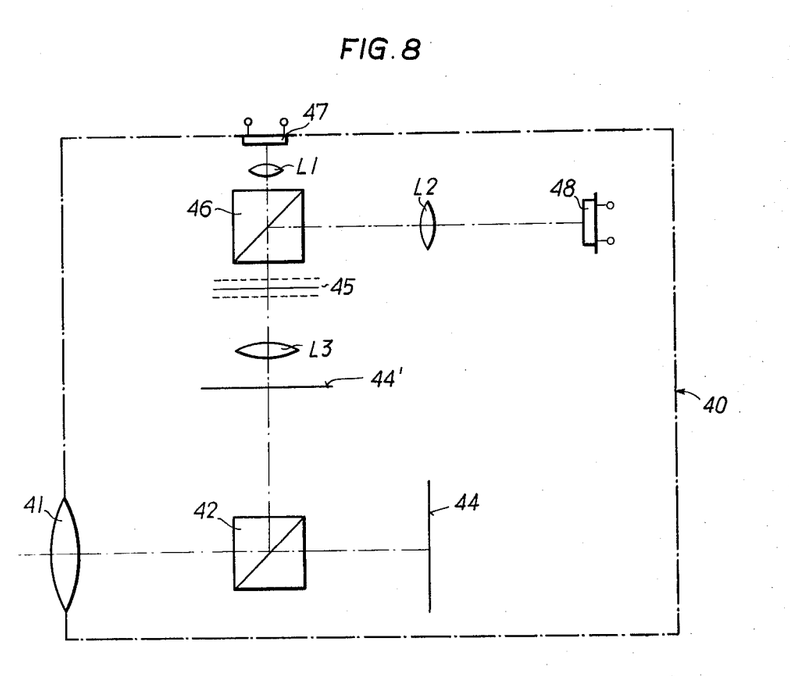
FIG. 8 schematically illustrates the optical construction of a further inventive embodiment.

In FIG. 8 a further embodiment of the invention is schematically illustrated. In a camera 40 a path of rays is defined by an objective 41 and is guided through a beam splitter to a film plane 44. This film plane corresponds to a focal plane 44' in the path of rays of the part of rays reflected by the beam splitter 42. The image from the focal plane 44 is magnified in an image plane 45 by means of an intermediate optic L 3, whereby approximately half of the rays are subsequently led to a photocell 47 by means of a beam splitter 46 over a measuring lens L 1 of relatively short focal length.

The part of rays reflected by the beam splitter 46 reaches a further photocell 48 after having passed a measuring lens L 2 of relatively long focal length.

Figure 9:
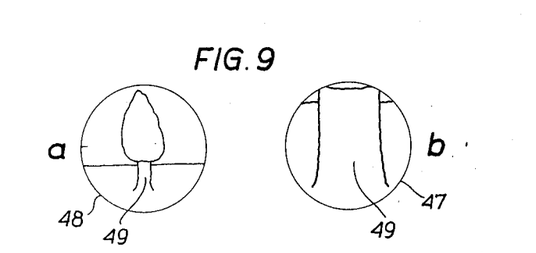
FIGS. 9a and 9b show the images appearing in the plane of the photocells at insufficient focus, whereas FIG. 10 displays an especially advantageous arrangement of photocells.

With the aid of the system of short focal length L 1 an object is now reproduced in a focal plane in which lies the photocell 47. Likewise the system of long focal length L 2 reproduces the object in the ratio 1: 1 in a focal plane in which lies the photocell 48. If the object distance changes also the reproduction scale changes, namely with the optic of short focal length much more that with than of long focal length. Now the two images have no more the same size. How this may be like in an extreme case is illustrated in FIG. 9.

Here in FIG. 9a the image is illustrated on photocell 48, in FIG. 9b on photocell 47 at unsharp setting. Out of a scene for instance a tree with a trunk 49 is reproduced on photocell 47. In the plane of the photocell 47 this trunk 49 appears much larger, but also much more out of focus. By the change of scale there results not only a change of brightness on the photocell 47, but also by magnification of the image in comparison to the image on photocell 48, a change of image sharpness.

It is clear that the two optical systems L 1, L 2 must be adjusted so that upon focusing of the objective 41 of the camera 40, the image on the two photocells 47, 48 must have the same reproduction scale. If, by a wrong focusing of the objective 41, a reproduction occurs in front or behind, respectively, the plane of sharpness 44', a smaller or larger image, respectively, will be obtained on the photocells 47, 48, whereby the change of scale is much smaller on photocell 48. From the difference of image size a control signal is obtained, which may be used for the control of a servomotor for focusing of the objective 41, as it is known per se. For this purpose only a reference circuit between photocell 47 and photocell 48, respectively, is necessary. The required direction of displacement is to be found out by the ratio of the reproduction scales on the two photocells 47, 48. If the reproduction on photocell 47 is larger than on photocell 48, the objective 41 must be adjusted in the direction of a shorter distance, if the reproduction is smaller than that on photocell 48, the adjustment has to be made in the direction "infinite". In both of the cases the movement of adjustment of the objective 41 has to be performed as long as the reproduction on the two photocells is equally large. It may be mentioned here that preferably only a small section of the scene to be taken may be used for measuring.

The larger the magnification of the objective 41, the more sensitive becomes the measuring on the two photocells 47, 48. The reason therefore is that the scale of depth changes in square to the lateral magnification of the image. Since however the magnification ratio of the objective 41 may not be optionally chosen, it is efficient to provide a magnification system L 3 behind the beam splitter 42, so that at given magnification ratio of the objective 41, the sensitivity of the measuring on the photocells 47, 48 may be improved. It has proved that by such a design a change of the reproduction scale in the range of +13 percent and −11 percent, respectively, for the depth of field may be obtained, which corresponds to an increase of 28 percent and a decrease of 23 percent in area. The image that is formed in the plane of the front limit of depth of field is, with respect to its surface measure, consequently larger by 66 percent compared to an image in the rear limit of depth of field.

If for instance in the range of focal plane 44 the depth interval between two objects situated at the limits of depth of field for open diaphragm is 72 $\mu$, there results a fourfold magnification by means of the magnification optic L 3 a depth interval of 1,15 mm in the focal plane 45 situated in front of the beam slitter 46.

Under the condition of such a magnification optic L 3 and at a focal length of $f_1 = 5$ mm of the system of short focal length L 1 and at a focal length of $f_2 = 50$ mm of the system of long focal length L 2, the following reproduction scales for the images of objects situated at the depth of field limits in the range of the beam splitter 46 are obtained. The reproduction scale in the range of the focal plane 45 in front of the beam splitter 46 is 1.

| Example 1 | $f_1 = 5$ mm | $f_2 = 50$ mm |
|---|---|---|
| reproduction in the rear limit of depth of field | $\beta_1 = 1,13$ | $\beta_2 = 1,01$ |
| reproduction in the front limit of depth of field | $\beta_1 = 0,895$ | $\beta_2 = 0,99$ |

It results thereof a change of the reproduction scale in the range of −10 to +12 percent.

| Example 2 | $f_1 = 10$ mm | $f_2 = 25$ mm |
|---|---|---|
| reproduction in the rear limit of depth of field | $\beta_1 = 1,06$ | $\beta_2 = 1,02$ |
| reproduction in the front limit of depth of field | $\beta_1 = 0,945$ | $\beta_2 = 0,973$ |

Hence it follows, also at a difference of focal length of 1 : 2,5, a scale difference of −3 to +4 percent. The scale difference however depends not only on the difference of focal length, but also on the absolute size of the focal lengths. A difference of focal length of more than 1:2 is however advantageous.

Figure 10:
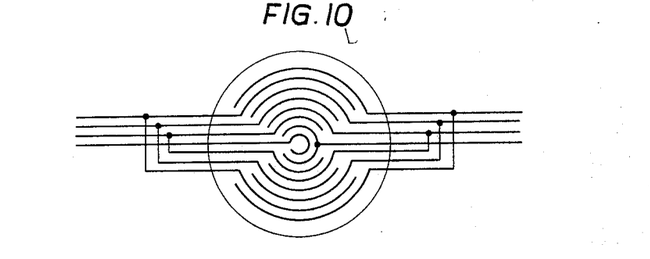

In FIG. 8 only a single photocell 47 and 48, respectively, in each image plane has been specified. A better evidence about focusing however may be obtained, if instead of a single, stationary photocell either a photocell is used, which passes different image spots of the image drawn up by the optical systems L 1 and L 2, respectively or if lines of photocells are used. A preferred embodiment of arrangements of photocells is illustrated in FIG. 10, in which photo resistors are arranged in concentrical rings. Identical arrangements must then either be provided in the image planes of the optics L 1 and L 2 or such an arrangement must be transferred one after the other in both of the image planes. The interrogation can only take place, if photo resistors of the two groups of photocells lying on the same radius lie together in a differential circuit; preferably however an interrogation circuit according to FIG. 5 is used. By the concentrical arrangement of the photocells, the purpose of scale comparison is better taken into account. In the case of a single photocell arrangement, which is displaceable in both image planes, of course a data storage means for the information received in each of the image planes must be provided. In such an embodiment — referring to FIG. 2 — there must be provided operating means for the photocell to move it from position n-1 till n-19 and then for example from n-19' to n-1' or vice versa. The operating means may include manual operation means, such as the release button itself, or a motor. Instead of moving a single cell over both strokes n-1 to n-19 and n-1' to n-19' respectively, also the use of two photocells is possible which are guided each on one of the two strokes. In this way reversing the direction of movement of the photoelectric receiver is avoided.

What is claimed is:

1. In a rangefinder system, in combination:
   at least one adjustable objective for forming a first image of an object in a first image plane;
   means for adjusting said objective to focus the image in said plane;
   optical means for forming a second image of said object in a second image plane, with focused objective said first and second images being identical, whereas with defocused objective said images being different;
   photoelectric receiver means scanned along predetermined paths within said first and second image planes, with focused objective said paths include identical image points, said photoelectric receiver means supplying an electric output depending on the brightness of the individual image points of said images:
   operating means to scan said photoelectric receiver means along said predetermined paths;
   means for comparing the output signals derived from the first image with the output signals derived from the second image;
   evaluation means connected to the comparison means to be controlled by the latter.

2. In a rangefinder system, in combination:
   at least one adjustable objective for forming a first image of an object in a first image plane;
   means for adjusting said objective to focus the image in said plane;
   optical means for focusing a second image of said object in a second image plane, with focused objective, said first and second images being identical whereas with defocused objective said images being different;
   a plurality of first photoelectric receivers arranged within said first image plane at predetermined locations;
   a plurality of second photoelectric receivers arranged within said second image plane at locations which correspond with focused objective to those of said first photoelectric receivers in said first image plane;
   said first and second photoelectric receivers supplying an electric output depending on the brightness of the individual image points at the respective locations,
   with focused objective the outputs of said first receivers being fully identical to that of said second receivers;
   means for comparing the output signals supplied by said first photoelectric receivers with the output signals supplied by said second photoelectric receivers;
   evaluation means connected to the comparison means to be controlled by the latter.

3. A rangefinder system as set forth in claim 2 wherein said objective is a camera objective, further comprising a camera housing, said system being built in said housing.

4. A rangefinder system as set forth in claim 2 wherein said first and second photoelectric receivers comprise photodiodes.

5. A rangefinder system as set forth in claim 4 wherein said photo-diodes are arranged in arrays.

6. In a rangefinder system, in combination:
   an adjustable objective for forming a first image of an object in a first image plane, said objective defining an optical axis and comprising a first optical arrangement providing an optical path of object light beams which are parallel to said optical axis, and a second optical arrangement providing an optical path of object light beams which converge towards said first image plane;
   means for adjusting said objective to focus the image in said plane,
   a pair of identical crossed prisms located adjacent each other but on opposite sides of said optical axis and situated within said first image plane when said objective is focused,
   image reversing means in said optical path of parallel object light beams, said image reversing means being arranged to reverse only a first part of said first image which is delivered to one of said prisms, a second part of said first image delivered to the other of said prisms being identical to said first part of said first image and remaining unchanged,
   optical means for forming second and third images of said object in at least a second image plane past said prisms,
   photoelectric receiver means to receive light from predetermined image points of said second image and from corresponding image points of said third image, said photoelectric receiver means supplying electric output signals depending on the brightness of the individual image points, with focused objective the output signals derived from said second image being fully identical to those derived from said third image,
   means for comparing the output signals derived from said second image with those derived from said third image, and
   evaluation means connected to the comparison means to be controlled by the latter.

7. A rangefinder system as set forth in claim 6 wherein said image reversing means comprise Dove-prism.

8. A rangefinder system as set forth in claim 6 wherein said image reversing means comprise an Abbé-König prism.

9. A rangefinder system as set forth in claim 6 further comprising deflector means in said optical path of parallel object light beams, said deflector means being arranged to deflect only the light beams of that image of said image reversing means which is deflected to one of said prisms.

10. In a rangefinder system
    an adjustable objective and a first optical system for forming a first image of an object in a first image plane, said objective defining an optical axis and including a front lens;
    means for adjusting said objective to said first image in said plane;

deflecting means arranged on said first optical axis to transmit a portion of light coming through said front lens;

a second optical system receiving light from said deflecting means and having a lens forming a second image; and said first and second optical systems having different focal lengths; with focused objective said first and second images being identical, whereas with defocused objective said first and second images showing measurable magnification differences.

11. A rangefinder system as set forth in claim 10 wherein said objective forms a thrid image in an intermediate image plane.

12. A rangefinder system as set forth in claim 10 wherein said second optical system forms said second image in a second image plane.

13. A rangefinder system as set forth in claim 10 further comprising photoelectric receiver means to receive light from predetermined image points of said second image and from corresponding image points of said first image, said photoelectric receiver means supplying electric output signals depending on the brightness of the individual image points;

means for comparing the output signals derived from said second image with those derived from said first image; evaluation means connected to the comparison means to be controlled by the latter.

14. A rangefinder system as set forth in claim 13 wherein said photoelectric receiver means comprises a plurality of photoelectric transducers.

15. A rangefinder system as set forth in claim 14 wherein said photoelectric transducers are arranged concentrically to said optical axis.

16. A rangefinder system as set forth in claim 10 wherein the ratio of said focal lenths amounts to at least 1:2.

17. A rangefinder system as set forth in claim 11 for a camera further comprising an additional magnifying system arranged before said deflecting means.

18. A rangefinder system as set forth in claim 17, further comprising beam splitting means arranged before said deflecting means, said magnifying system being located between said deflecting means and said beam splitting means.

19. A rangefinding method comprising the steps of:

a. forming at least a first and a second image of an object each by one optical system;

b. transducing a plurality of selected image points of said images into electric signals, the image points selected from the first image corresponding to those selected from the second image, at least one parameter value of each signal corresponding to the brightness of the respective image point;

c. comparing the parameter values derived from said first image with those of said second image by computing the cross-correlation of said parameter values, including multiplying each parameter value derived from said first image with another one drived from said second image, and thereafter integrating the products received by said multiplying step.

20. The method as set forth in claim 19 whereby said step of comparing includes phase-shifting of the propagation time of the signals derived from said first image relative to those derived from said second image.

21. In a rangefinder system at least one adjustable objective for forming a first image of an object in a first image plane;

means for adjusting said objective to focus the image in said plane;

optical means for forming a second image of said object in a second image plane, with focused objective said first and second images being identical, whereas with defocused objective said images being different;

a plurality of first photoelectric receivers arranged within said first image plane at predetermined locations;

a pluralty of second photoelectric receivers arranged within said second image plane at locations which correspond with focused objective to those of said first photoelectric receivers in said first image plane;

said first and second photoelectric receivers supplying an electric output, one parameter thereof, depending on the brightness of the individual image points at the respective locations, with focused objective said values of said first receivers being fully identical to that of said second receivers;

computing means to determine the cross-correlation of said values, said computing means including multiplying means to calculate the product of each of said values derived from said first image with another one derived from said second image, connecting means to connect said photoelectric receivers with said multiplying means, integrating means connected with said multiplying means for integrating said products;

evaluation means connected with said integrating means to be controlled by the latter.

22. In a rangefinder system at least one adjustable objective for forming a first image of an object in a first image plane;

means for adjusting said objective to focus the image in that plane;

optical means for forming a second image of said object in a second image plane, with focused objective said first and second images being identical, whereas with defocused objective said images being different;

a pluralty of first photoelectric receivers arranged within said first image plane at predetermined locations;

a pluralty of second photoelectric receivers arranged within said second image plane at locations which correspond with focused objective to those of said first photoelectric receivers in said first image plane;

said first and second photoelectric receivers supplying an electric output, one parameter value of which depending on the brightness of the individual image points at the respective locations, with focused objective said values of said first receivers being fully identical to that of said second receivers;

computing means to determine the cross-correlation of said values, said computing means including a first threshold value circuit connected with said first photoelectric receivers for digitalizing the output thereof, a second threshold value circuit connected with said second photoelectric receivers for digitalizing the output thereof, exclusive-or-gate means connected with said first and second threshold value circuit to calculate the products of the digitalized outputs thereof; integrating means connected with said gate means for integrating said products;

evaluation means connected with said integrating means to be controlled by the latter.

23. A rangefinder system as set forth in claim 22 further comprising:

a first high-pass filter connected in series between said first receivers and said first threshold value circuit, and a second high-pass filter connected in series between said second receivers and said second threshold value circuit.

24. In a rangefinder system at least one adjustable objective for forming a first image of an object in a first image plane;

means for adjusting said objective to focus the image in said plane;

optical means for forming a second image of said object in a second image plane;

said objective and said optical system providing a triangulation base, said base lying at least within the aperture of said objective; with focused objective said first and second images being identical whereas with defocused objective said images being shifted relative to each other;

a pluralty of first photoelectric receivers arranged within said first image plane at predetermined locations;

a pluralty of second photoelectric receivers arranged within said second image plane at locations which correspond with focused objective to those of said first photoelectric receivers in said first image plane;

said first and second photoelectric receivers supplying an electric output, one parameter value of which depending on the brightness of the individual image points at the respective locations, with focused objective said values of said first receivers being fully identical to that of said seocnd receivers whereas with defocused objective there exists a phase-shift between said both outputs;

computing means to determine the cross-correlation of said values, said computing means including shifting means connected at least with one of said receivers for phase shifting of the corresponding output, said shifting means having an operative and a non-operative condition;

operating means connected with said shifting means to provide shifted and unshifted outputs;

multiplying means to calculate the product of each of said values derived from said first image with each value of the same phase derived from said second image, connecting means to connect said photoelectric receivers with said multiplying means, integrating means connected with said multiplying means for integrating said products;

evaluation means connected with said integrating means to be controlled by the latter, said evaluation means comprising:

phase-detector means to detect the relative shift between said images.

25. A rangefinder system as set forth in claim 24 further comprising:

a first threshold value circuit connected with said first photoelectric receivers for digitalizing the output thereof;

a second threshold value circuit connected with said second photoelectric receivers for digitalizing the output thereof;

said multiplying means comprising exclusive-or-gate means connected on its input side with said first and second threshold value circuits.

26. A rangefinder system as set forth in claim 25 further comprising:

a first high-pass filter connected in series between said first receivers and said first threshold value circuit, and a second high-pass filter connected in series between said second receivers and said second threshold value circuit.

27. A rangefinder system as set forth in claim 24 wherein said operating means have an operating frequency to operate sequentially said shifting means with said operating frequency, whereby storage means are provided and connected in circuit after said photoelectric receivers.

28. A rangefinder system as set forth in claim 27 wherein said storage means are arranged after said multiplying means.

29. A rangefinder system as set forth in claim 24 further comprising:

a timing impulse generator for supplying timing pulses to said photoelectric receivers;

a start impulse generator for supplying starting impulses at a predetermined frequency to said photoelectric receivers;

said shifting means being connected in series between said start impulse generator and one of said first and second photoelectric receivers; said operating means comprises frequency-dividing means having its output connected with said start inpulse generator and supplying control impulses to said shifting means, said control impulses having a frequency being a fraction of the start impulse frequency.

30. A rangefinder system as set forth in claim 29 wherein said frequency-dividing means are connected with said phase-detector means for supplying said control impulses thereto.

* * * * *